United States Patent [19]

Turner

[11] Patent Number: 4,540,762
[45] Date of Patent: Sep. 10, 1985

[54] COPOLYMERS OF SODIUM STYRENE SULFONATE AND SODIUM-N-(4-SULFOPHENYL)-MALEIMIDE

[75] Inventor: S. Richard Turner, Pittsford, N.Y.

[73] Assignee: Exxon Research and Engineering Co., Florham Park, N.J.

[21] Appl. No.: 560,222

[22] Filed: Dec. 12, 1983

Related U.S. Application Data

[63] Continuation-in-part of Ser. No. 416,938, Sep. 13, 1982, abandoned.

[51] Int. Cl.³ .............................................. C08F 22/40
[52] U.S. Cl. .................................... 526/262; 526/287; 526/288
[58] Field of Search ........................ 526/262, 287, 288

[56] References Cited

U.S. PATENT DOCUMENTS

| | | | |
|---|---|---|---|
| 3,642,728 | 2/1972 | Canter | 260/79.3 |
| 3,836,511 | 9/1974 | O'Farrell et al. | 260/79.3 |
| 3,847,854 | 11/1974 | Canter et al. | 260/23.7 |
| 3,870,841 | 3/1975 | Makowski et al. | 260/23.7 |

Primary Examiner—Harold D. Anderson
Attorney, Agent, or Firm—Richard E. Nanfeldt

[57] ABSTRACT

This invention relates to a water soluble alternating copolymer having a 50 mol. % portion of a sodium-N-(4-sulfophenyl)-maleimide monomer and a 50 mol. % portion of a sulfonated styrenic comonomer. The sulfonated styrenic comonomer is characterized by the formula:

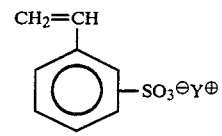

wherein $Y^{\oplus}$ is a cation selected from the Groups IA, IIA, IB or IIB of the Periodic Table or an amine of the formula $^{\oplus}NHR_1 R_2$ where $R_1$, $R_2$ and $R_3$ can be aliphatic groups of $C_1$ to $C_{12}$, wherein the alternating water soluble copolymers are useful as thermally stable deflocculating agents in water based drilling muds.

3 Claims, No Drawings

COPOLYMERS OF SODIUM STYRENE SULFONATE AND SODIUM-N-(4-SULFOPHENYL)-MALEIMIDE

CROSS REFERENCE TO RELATED APPLICATIONS

This application is a CIP of Ser. No. 416,938 filed Sept. 13, 1982, now abandoned.

BACKGROUND OF THE INVENTION

Field of the Invention

The formation of sulfonate-containing polymers has been clearly defined in a number of U.S. Pat. Nos.: 3,642,728; 3,836,511; 3,847,854; 3,870,841; and 3,877,530. These patents teach the formation of sulfonate polymers by contacting a polymer having olefinic unsaturation with a sulfonating agent.

This application differs from the previously identified U.S. patents in that the instant process is directed at the free radical solution polymerization of two polymerizable sulfonate-containing monomers such as sodium-N-(4-sulfophenyl)-maleimide monomer and a sulfonated styrenic monomer to form an alternating water soluble copolymer having a 50 mol. % portion of the sodium-N-(4-sulfophenyl)-maleimide monomer units and a 50 mol. % portion of the sulfonated styrenic monomer units. The sulfonated styrenic monomer is characterized by the formula:

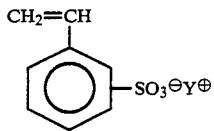

wherein $Y^+$ is a cation selected from the Groups IA, IIA, IB or IIB of the Periodic Table or an amine of the formula $^+NHR_1R_2R_3$ where $R_1$, $R_2$ and $R_3$ can be aliphatic groups of $C_1$ to $C_{12}$.

The formed water soluble copolymers contain about 50 mol. %, due to the alternating nature of the copolymerization of sodium-N-(4-sulfophenyl)-maleimide. The sulfonated styrenic comonomer is also contained in about 50 mol. %.

SUMMARY OF THE INVENTION

The present invention relates to sulfonate-containing water soluble copolymers of sodium-N(4-sulfophenyl)-maleimide and a monomer characterized by the formula:

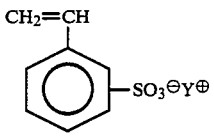

wherein $Y^+$ is a cation selected from Groups IA, IIA, IB, or IIB of the Periodic Table or an amine of the formula $^+NHR_1R_2R_3$ where $R_1$, $R_2$ and $R_3$ can be aliphatic groups of $C_1$ to $C_{12}$, wherein the copolymers are formed by a free radical solution copolymerization process.

The water soluble copolymers formed from the free radical solution copolymerization process of the instant invention can be generally described as having an $\overline{M}_n$ of about 5,000 to 200,000 and having at least about 13.5 wt. % of chemically combined sulfur therein. The free radical copolymerization process of the instant invention can be generally described as a free radical solution polymerization of the water soluble N-(4-sodiumsulfophenyl)-maleimide with a sulfonate monomer which is water soluble, at a temperature sufficient to cause polymerization. The alternating water soluble copolymer described in this invention are useful as thermally stable deflocculating agents in water based drilling muds. Generally as oil wells are drilled to greater depths the bottom hole temperatures increase. This phenomenum is known as the geothermal gradient. At these elevated temperatures the suspended clays, which constitute a major component of the drilling fluids, can begin to flocculate. Upon flocculation the drilling mud loese the rheological properties that make it useful as a drill bit lubricant and as a medium to remove the drill cuttings from the hole. Polyelectrolytes, such as the sodium salt of polyacrylic acid can increase the use temperature range of these muds but lose their efficiency at 250°–300° F. Addition of the completely sulfonated water soluble polymer described in this invention yields a drilling mud that exhibits much improved performance over other polyelectrolytes in preventing clay flocculation at elevated temperatures. For example, muds formulated with the alternating copolymer of sodium styrene sulfonate and sodium-N-(4-sulfophenyl)-maleimide exhibited stability from flocculation at temperatures of 300° F. and above. A typical drilling mud made with the copolymer of sodium styrene sulfonate and sodium-N-(4-sulfophenyl)-Malmeimide comprises an organic liquid such as an oil, water, an emulsifier, a wetting agent, a weighting material and the copolymer of sodium styrene sulfonate and sodium-N-(4-sulfophenyl)-malmeimide.

PRIOR ART

Although water soluble, sulfonated copolymers are well-known in the art, this is the first example of a fully sulfonated alternating water soluble copolymer prepared by solution copolymerization.

GENERAL DESCRIPTION OF THE INVENTION

The water soluble solid elastomeric copolymers of the instant invention comprise a copolymer of sodium-N-(4-sulfophenyl)-maleimide monomer unit and a sulfonate-containing monomer unit characterized by the formula:

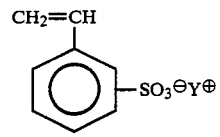

wherein $Y^\oplus$ is a cation selected from Groups IA, IIA, IB and IIB of the Periodic Table or an amine of the formula:

where $R_1$, $R_2$ and $R_3$ can be aliphatic groups of $C_1$ to $C_{12}$ or hydrogen, the copolymer being water soluble.

The instant invention relates to sulfonate-containing copolymers which are formed by a free radical solution polymerization process. The monomer used in the free radical solution copolymerization process is sodium-N-(4-sulfophenyl)-maleimide which is copolymerized with other sulfonate-containing monomers.

The sodium-N-(4-sulfophenyl)-maleimide monomer and sulfonate-containing monomer are dissolved in a water phase in the presence of a water soluble initiator, wherein the temperature is sufficient to initiate polymerization. The polymerizate is added to a non-solvent and the resultant precipitate is filtered and dried under high vacuum.

The copolymers formed from the free radical solution copolymerization of the instant invention can be generally described as having an $\overline{M}_n$ of about 5,000 to about 200,000, more preferably about 10,000 to about 100,000.

The formed copolymers contain about 50 mol. % or about 57 wt. % of sodium-N-(4-sulfophenyl)-maleimide monomer units and about 50 mol. % or 43 wt. % of the sulfonated sytrenic monomer units.

The sulfonated styrenic monomers of the instant invention which are water soluble can be generally described as monomers having unsaturation and a metal or amine sulfonate group. The metal or amine neutralized sulfonate monomer is characterized by the formula:

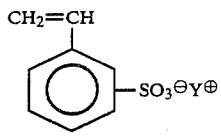

wherein $Y^\oplus$ is a cation selected from Groups IA, IIA, IB and IIB of the Periodic Table or an amine of the formula:

where $R_1$, $R_2$ and $R_3$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate-containing monomers is:

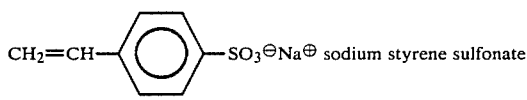

An especially preferred sulfonate-containing monomer is a metal sulfonate styrene. The molar ratio of the metal sulfonated styrene monomer to the sodium-(4-sulfophenyl)-maleimide is about 1 to 1.

The sodium-N-(4-sulfophenyl)-maleimide monomer used in the free radical solution copolyermization is prepared by a two-step process, wherein first maleic anhydride, is reacted with sulfanilic acid, sodium salt monohydrate in a methanol solution at room temperature to form a half imide (II) according to the reaction scheme:

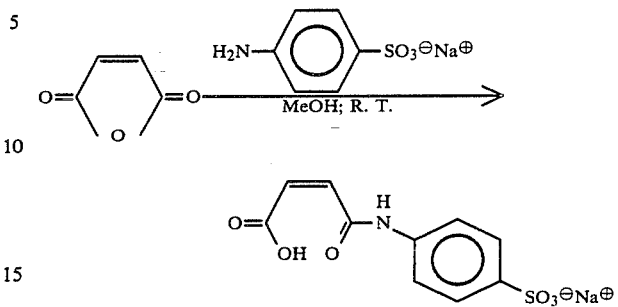

The formed precipitate of the half imide (II) was recovered by filtration and dried under high vacuum.

In the second step, the previously formed half imide (II) is refluxed with sodium acetate and acetic anhydride until a tannish color developed. After cooling, the formed precipitate of the sodium-N-(4-sulfophenyl)-malimide (III) is formed. The reaction scheme is:

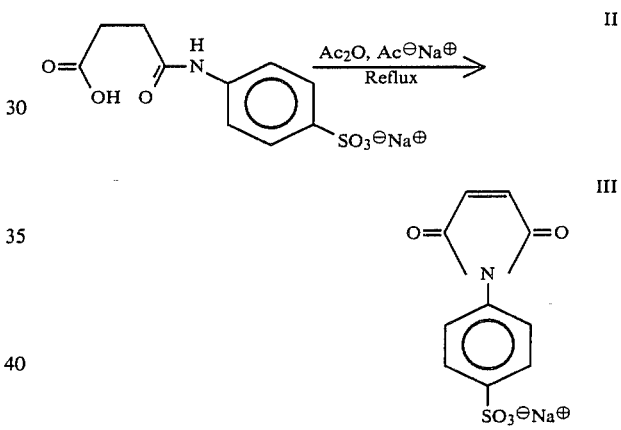

The copolymerization of the styrenic sulfonated monomer with the N-(4-sodiumsulfophenyl)-maleimide comprises the steps of dissolving both the styrenic sulfonated comonomer and the sodium-N-(4-sulfophenyl)-maleimide in deoxygenated water at 50° C. under $N_2$ positive pressure and a water soluble peroxy initiator is added to the solution. The reaction is allowed to proceed for about 1.25 to about 48 hours, more preferably about 4 to about 24 hours. Acetone is added to the reaction solution and the resultant precipitate is filtered and dried under high vacuum.

The water soluble peroxy initiators are selected from the group consisting of potassium peroxydisulfate and ammonium, persulfate, wherein the preferred initiator is potassium peroxydisulfate. The concentration of initiator is about 0.01 to about 1 wt. % based on total reaction solution, more preferably about 0.1 to about 0.5.

Redox initiator systems can be employed as initiators in the free radical solution copolymerization. The water soluble couples are most useful, e.g., Fe(II) and hydrogen peroxide.

Chain transfer agents can be readily employed in the instant polymerization process for controlling the molecular weight of the resultant copolymer.

DETAILED DESCRIPTION OF THE PREFERRED EMBODIMENTS

EXAMPLE I

Preparation of Half Imide

To a solution of 54.0 g. sulfanilic acid, sodium salt monohydrate (234 mmoles) in 1000 ml. abs. MeOH was added a solution of 35.0 g. maleic anhydride (357 mmoles, 1.53 equivalents) in 250 ml. abs. MeOH. After stirring at room temperature for less than five minutes, a yellow precipitate formed. The reaction was allowed to continue for a total of 20 minutes, then the precipitate was filtered off and dried under high vacuum giving 67.89 g. II (99.1% yield).

IR (Nujol): 3280 cm$^{-1}$ (broad), 1715 cm$^{-1}$, 1630 cm$^{-1}$, 1560–1480 cm$^{-1}$ (broad), 1320 cm$^{-1}$ (weak), 1300 cm$^{-1}$, 1200 cm$^{-1}$, 1120 cm$^{-1}$, 1040–1000 cm$^{-1}$ (3 peaks), 970 cm$^{-1}$, 900 cm$^{-1}$, 850 cm$^{-1}$, 710 cm$^{-1}$, 640 cm$^{-1}$, 620 cm$^{-1}$.

Analytical analysis: Calculated C, 40.96; H, 2.73; N, 4.78; S, 10.92. Found C, 37.38; H, 353; N, 4.36; S, 10.02.

EXAMPLE II

Preparation of Sodium-N-(4-sulfophenyl)-Maleimide

A slurry of 0.8 g. sodium acetate (9.8 mmoles) and 16.0 g. II (54.6 mmoles) in 200 ml. acetic anhydride was refluxed until a color change to a tannish solution was noted. The solution was cooled to room temperature and diluted with 200 ml. EtOH:Acetone 3:2. The solution was filtered and the precipitate was slurried in an additional 200 ml. EtOH:Acetone 3:2 then filtered. The precipitate was dried under high vacuum giving 10.23 g. III (68.1%).

IR (Nujol): 1770 cm$^1$ (weak), 1700 cm$^{-1}$, 1600 cm$^{-1}$, 1500 cm$^{-1}$, 1400 cm$^{-1}$, 1210 cm$^{-1}$, 1180 cm$^{-1}$, 1130 cm$^{-1}$, 1040 cm$^{-1}$, 1010 cm$^{-1}$, 950 cm$^{-1}$, 820 cm$^{-1}$, 755 cm$^{-1}$, 720 cm$^{-1}$, 690 cm$^{-1}$, 670 cm$^{-1}$, 625 cm$^{-1}$ (weak).

Analysis: Calcd. C, 43.64; H, 2.18; N, 5.09; S, 11.64. Found C, 42.61; H, 2.87; N, 5.92; S, 11.75.

NMR (D$_2$O): 6.35, singlet, 2H; 7.3–8.0, multiplet, 4H.

EXAMPLE III

Formation of Copolymers

Copolymerization

To a stirred solution of 10.0 g. sodium-N-(4-sulfophenyl)-maleimide (36.4 mmole) and 7.49 g. sodiumstyrenesulfonate (36.4 mmole) in 100 ml. deoxygenated H$_2$O at 50° C. under N$_2$ positive pressure was added 0.01 g. potassiumperoxydisulfate. The mixture was allowed to react for 24 hours then the product was precipitated by addition of the solution to 2000 ml. acetone. The pinkish, fibrous precipitate (VII) was filtered and dried under high vacuum giving 14.28 g. (81.6% yield).

IR (film from H$_2$O): 3100 cm$^{-1}$ (weak), 3060 cm$^{-1}$, (weak), 2190 cm$^{-1}$ (weak), 1770 cm$^{-1}$, 1700 cm$^{-1}$, 1600 cm$^{-1}$, 1200 cm$^{-1}$, 1120 cm$^{-1}$, 1035 cm$^{-1}$, 830 cm$^{-1}$, 710 cm$^{-1}$.

Analysis Calcd. N, 2.92; S, 13.36. Found N, 3.05; S, 13.57.

This copolymerization was shown to be a predominately alternating by determining the copolymer composition at various comonomer feed compositions at low copolymer conversions (FIG. 1). Nitrogen analysis was used for the composition determination.

This alternating copolymer exhibits polyelectrolyte behavior in distilled water which can be suppressed by the addition of salt. This is represented in FIG. 2. The copolymerization, as conducted in Example III, results in a relatively high molecular weight copolymer, as exemplified by an intrinsic viscosity of 2.0 in 2% NaCl solution.

What is claimed is:

1. A water soluble, solid alternating copolymer of about 50 mol. % sodium-N-(4-sulfophenyl)-maleimide monomer units and a metal or amine neutralized sulfonate monomer units characterized by the formula:

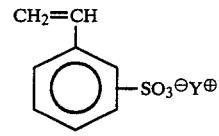

wherein Y$^\oplus$ is a cation selected from Groups IA, IIA, IB or IIB of the Periodic Table or an amine of the formula:

where R$_1$, R$_2$ and R$_3$ are aliphatic groups of C$_1$ to C$_{12}$ or hydrogen.

2. A copolymer according to claim 1 wherein said sulfonate-containing monomer is a metal neutralized sulfonated styrene.

3. A copolymer according to claim 1 wherein said sulfonate-containing monomer is sodium styrene sulfonate.

* * * * *